Patented Dec. 7, 1943

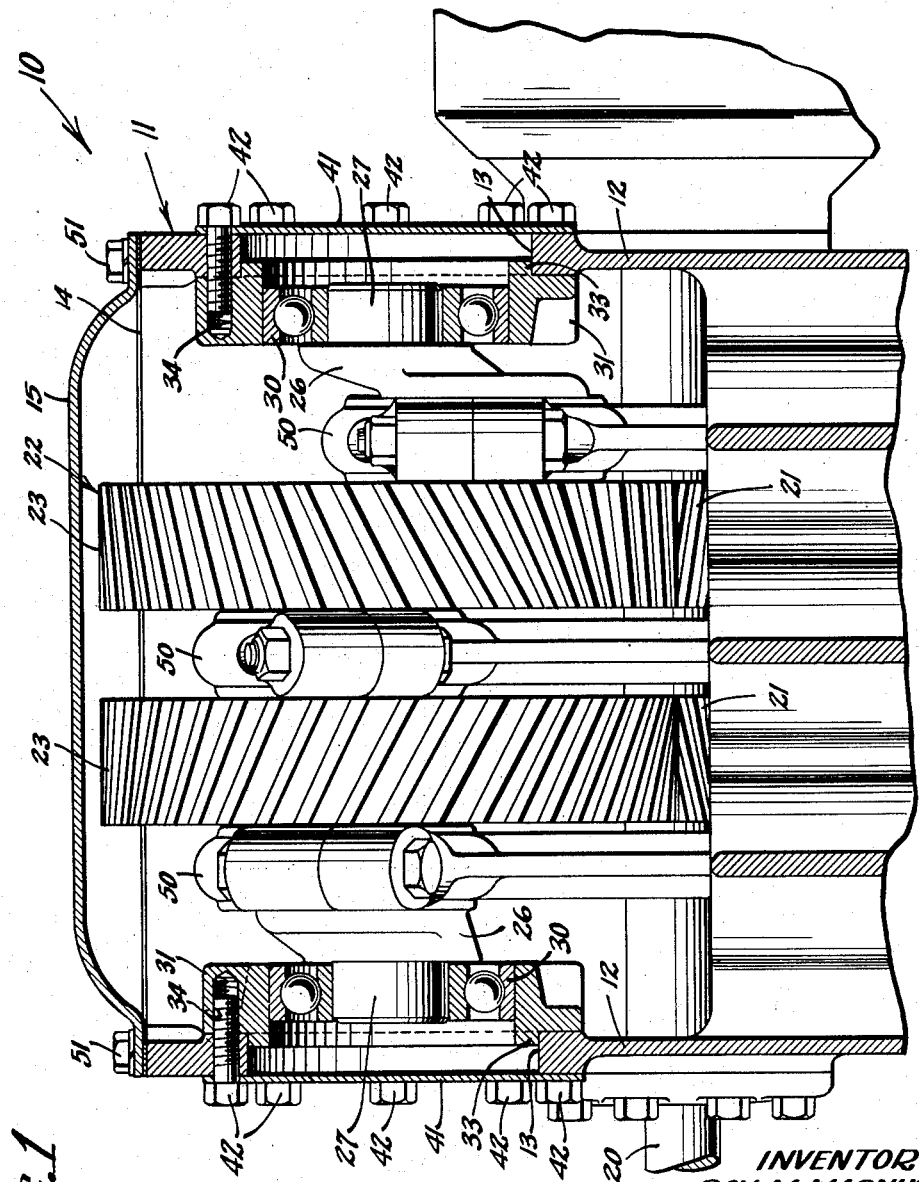

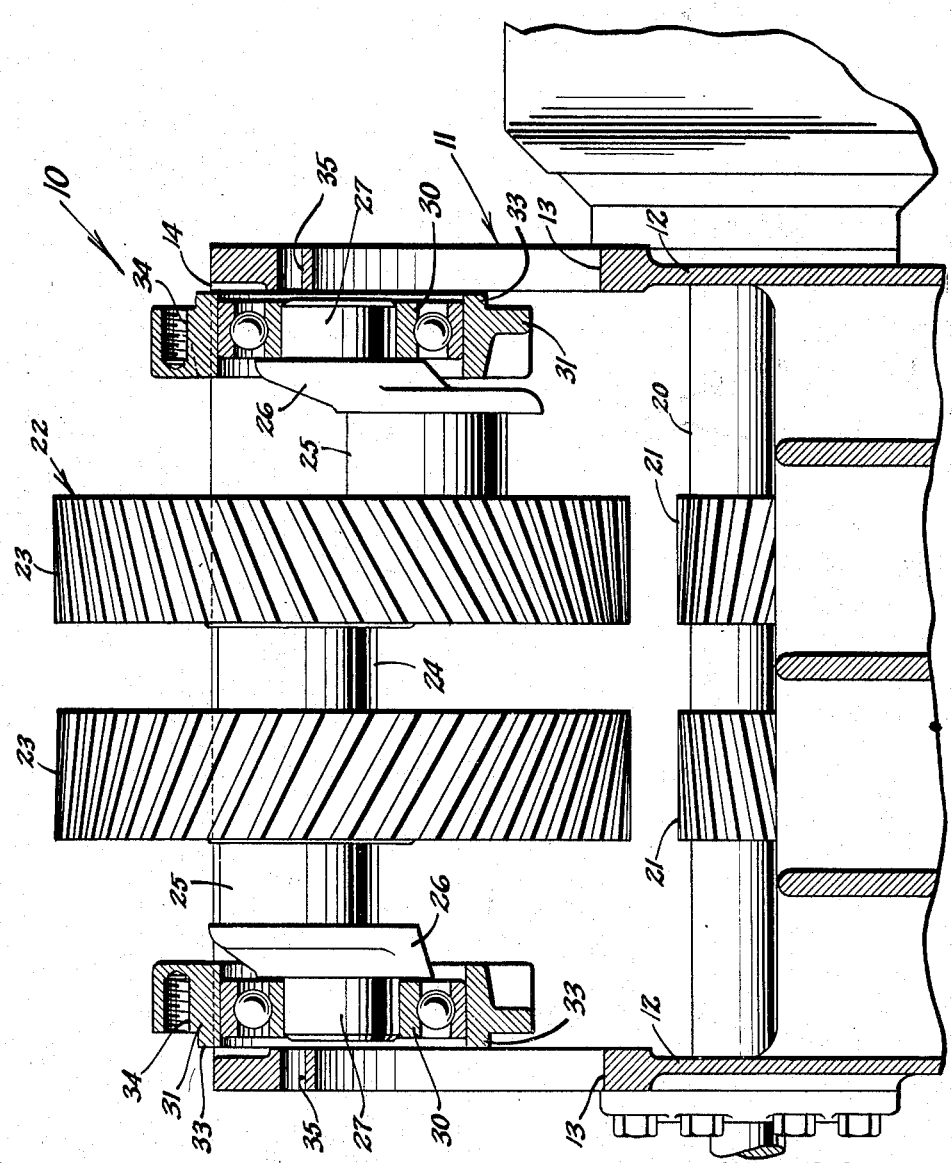

2,336,272

UNITED STATES PATENT OFFICE 2,336,272

CRANKCASE, CRANKSHAFT, AND BEARING ASSEMBLY

Roy M. Magnuson, Campbell, Calif., assignor to Food Machinery Corporation, San Jose, Calif., a corporation of Delaware Application October 9, 1941, Serial No. 414,330

7 Claims. (Cl. 308—179)

This invention relates to pump construction and has particular utility in the high pressure spray pump art.

Numerous problems are presented in the design and assembly of high pressure spray pumps due to the high load factors which the crank shafts of these pumps are required to sustain, and one of the features of these pumps which must be especially strong is the means for mounting the bearings.

In U. S. Letters Patent No. 2,038,747 issued to me April 28, 1936, on a Spray pump, I show a bearing construction in which the bearings of the crank shaft are mounted in cup shape members inserted inwardly into the crank case through aligned holes formed in the crank case. These cup shape members are then bolted to the outer face of the crank case. I have found in practice that in order for this mounting to satisfactorily support the bearings under the high loads to which these are subject, it is essential that these members when assembled have a press fit in the crank case openings receiving them. The reason for this necessity is the long distances between the planes in which the cup shape members are secured to the outer faces of the crank case and the planes in which the cup shape members support the crank shaft bearings.

It is impractical, however, to assemble these members on the crank case with a press fit as it is necessary that these pumps be repaired in the field by unskilled labor without access to the equipment necessary to remove these members when so fitted.

It is accordingly an object of this invention to provide a strong mounting for crank shaft bearings in a spray pump which are of such a nature as to permit the pump to be readily disassembled in the field without the use of special tools or highly skilled mechanics.

It is a further object of my invention to provide a novel crank case, crank shaft and bearing assembly suitable for use in spray pumps and in which the connection between each bearing mounting member and the crank case lies in a plane relatively close to the plane in which this mounting member supports a crank shaft bearing.

The manner of accomplishing the foregoing objects, as well as further objects and advantages, will be made manifest in the following description taken in connection with the accompanying drawings, in which:

Fig. 1 is a diagrammatic cross sectional view of a preferred embodiment of my invention as incorporated in a spray pump with the various elements involved completely assembled.

Fig. 2 is a view similar to Fig. 1 showing a portion of the parts involved in my invention in the process of assembly.

Referring specifically to the drawings, I have shown therein a spray pump 10 including a crank case 11 having spaced walls 12 which are provided with aligned openings 13, the crank case having an open mouth 14 which when the pump is assembled is adapted to be covered by a cover plate 15. Journalled in suitable bearings provided in the walls 12 is a drive shaft 20 having drive pinions 21.

The pump 10 also includes a crank shaft 22 and a pair of master drive gears 23 which are connected together by a crank pin 24 and which are in turn connected by crank pins 25 to members 26 from which trunnions 27 extend laterally, these trunnions being coaxial with each other and with the master drive gears 23.

It is desired to journal the crank shaft 22 in the crank case 11 so that master drive gears 23 mesh with the pinions 21 and with such a strong bearing construction that the crank shaft will be maintained, in spite of the enormous loads carried thereby, in perfect parallelism with the drive shaft 20. In my invention this is accomplished by the provision of ball bearings 30 which have a pressed fit over the trunnions 27 so as not to extend beyond the extremities of these trunnions and by bearing mounting rings 31 which slidably fit over the outer races of the bearings 30, these rings having outer annular axial flanges 33. Provided in the rings 31 are threaded holes 34 which are located so that when these rings are properly positioned in the assembly of the pump these holes will be in alignment with holes 35 provided in the walls 12.

The assembly of the pump 10 is effected as follows: The cover plate 15 being removed and the aligned openings 13 being unobstructed, as shown in Fig. 2, the bearings 30 and rings 31 are assembled on crank shaft 22 and the latter inserted through the crank case mouth 14 and the crank case 11, as shown in Fig. 2. This brings the gears 23 into mesh with the pinions 21 which centers the crank shaft 22 axially relative to the crank case due to the herringbone pattern of these gears and pinions. When the assembled parts thus inserted into the crank case come opposite the openings 13 so that they are coaxial with these openings, the rings 31 are shifted outwardly to extend the flanges 33 into the openings 13. The openings 13 are now covered with plates 41 having suitable apertures which when these plates are properly positioned are aligned with the holes 35 in the walls 12. When the plates 41 are thus positioned, and with the balance of the parts assembled as aforesaid, cap screws 42 are extended through the aforementioned holes in the plates 41 and through the holes 35 of the walls 12 and are screwed into the threaded holes 34 in the rings 31. The bearing assembly of the present invention is now completed, this complete assembly being illustrated in Fig. 1.

In this figure the pump itself is shown completely assembled with piston connecting rods 50 assembled on the crank pins 24 and 25 and with the cover plate 15 secured as by cap screws 51 to the crank case 11 so as to cover the mouth 14 thereof.

It is to be noted that when the pump is thus assembled the connections effected by the cap screws 42 between the walls 12 of the crank case 11 and the bearing mounting rings 31 are disposed directly outwardly radially from these bearings. The mounting rings 31 are thus much less susceptible than otherwise might be the case, to being sprung or cracked by the heavy loads imposed on the crank shaft 22 in the operation of the pump.

Not only do the elements of my pump 12 provide an extremely sturdy structure when united, as shown in Fig. 1, but the mode of assembly and disassembly of these elements is extremely easy to perform and greatly facilitates the manufacture and the maintenance of these pumps in the field.

While I have shown and described only a single embodiment of my invention, it is to be understood that other means may be used which still come within the spirit of the invention and the scope of the appended claims.

What I claim is:

1. In a crank case, crank shaft and bearing assembly, the combination of: a crank shaft with coaxial end trunnions; ball bearings fitted over said trunnions; bearing supporting rings surrounding said bearings and axially adjustable thereon; a crank case having spaced end walls and an opening therebetween adequate for admitting broadside into said crank case said crank shaft carrying said bearings and rings as aforesaid, with said bearings and rings disposed closely inside said end walls and parallel therewith, said rings being adjustable axially on said bearings to bring said rings into contact with inner faces of said end walls; and means to secure said rings to said inner faces of said end walls to integrate said assembly.

2. In a crank case, crank shaft and bearing assembly, the combination of: a crank shaft with coaxial end trunnions; ball bearings fitted over said trunnions; bearing supporting rings surrounding said bearings and axially adjustable thereon; a crank case having spaced end walls and an opening therebetween adequate for admitting broadside into said crank case said crank shaft carrying said bearings and rings as aforesaid, with said bearings and rings disposed closely inside said end walls and parallel therewith, said rings being adjustable axially on said bearings to bring said rings into contact with inner faces of said end walls; flanges on said rings, there being openings in said walls into which said flanges fit when said rings are adjusted axially as aforesaid; and means to secure said rings to said inner faces of said end walls to integrate said assembly.

3. In a crank case, crank shaft and bearing assembly, the combination of: a crank shaft with coaxial end trunnions; ball bearings fitted over said trunnions; bearing supporting rings surrounding said bearings and axially adjustable thereon; a crank case having spaced end walls and an opening therebetween adequate for admitting broadside into said crank case said crank shaft carrying said bearings and rings as aforesaid, with said bearings and rings disposed closely inside said end walls and parallel thereto, said rings being adjustable axially on said bearings to bring said rings into contact with inner faces of said end walls; means on the inner edges of said rings for engaging said bearings to limit axial movement of the latter when said rings contact said end walls as aforesaid; and means to secure said rings to said inner faces of said end walls to integrate said assembly.

4. In a crank case, crank shaft and bearing assembly, the combination of: a crank shaft with coaxial end trunnions; ball bearings fitted over said trunnions; bearing supporting rings surrounding said bearings and axially adjustable thereon; a crank case having spaced end walls and an opening therebetween adequate for admitting broadside into said crank case said crank shaft carrying said bearings and rings as aforesaid, with said bearings and rings disposed closely inside said end walls and parallel thereto, said rings being adjustable axially on said bearings to bring said rings into contact with inner faces of said end walls; flanges on said rings, there being openings in said walls into which said flanges fit when said rings are adjusted axially as aforesaid; means on the inner edges of said rings for engaging said bearings to limit axial movement of the latter when said rings contact said end walls as aforesaid; and means to secure said rings to said inner faces of said end walls to integrate said assembly.

5. In a crank case, crank shaft and bearing assembly, the combination of: a crank shaft with coaxial end trunnions; ball bearings fitted over said trunnions; bearing supporting rings surrounding said bearings and axially slideable thereon; a crank case having spaced end walls and an opening therebetween adequate for admitting broadside into said crank case said crank shaft carrying said bearings and rings as aforesaid, with said bearings and rings disposed closely inside said end walls and parallel thereto, said rings being adjustable axially on said bearings to bring said rings into contact with inner faces of said end walls; flanges on the outer ends of said rings adjacent the inner diameters thereof, there being openings in said end walls into which said flanges fit when said rings are adjusted axially as aforesaid; shoulders adjacent outer diameters of said rings said shoulders engaging inner faces of said end walls; and means to secure said rings to said inner faces of said end walls to integrate said assembly.

6. In a crank case, crank shaft and bearing assembly, the combination of: a crank shaft with coaxial end trunnions; ball bearings fitted over said trunnions; bearing supporting rings surrounding said bearings and axially adjustable thereon; a crank case having spaced end walls and an opening therebetween adequate for admitting broadside into said crank case said crank shaft carrying said bearings and rings as aforesaid, with said bearings and rings disposed closely inside said end walls and parallel thereto, said rings being adjustable axially on said bearings to bring said rings into contact with inner faces of said end walls; flanges on said rings, there being openings in said walls into which said flanges fit when said rings are adjusted axially as aforesaid; and a series of screws extending through said walls from the outside and into said rings to secure said rings to inner faces of said walls to integrate said assembly.

7. In a crank case, crank shaft and bearing assembly, the combination of: a crank shaft with coaxial end trunnions; ball bearings fitted over said trunnions; bearing supporting rings surrounding said bearings and axially adjustable thereon; a crank case having spaced end walls and an opening therebetween adequate for admitting broadside into said crank case said crank shaft carrying said bearings and rings as aforesaid, with said bearings and rings disposed closely inside said end walls and parallel thereto; said rings being adjustable axially on said bearings to bring said rings into contact with inner faces of said end walls; means to secure said rings to said inner faces of said end walls to integrate said assembly; and means disposed outwardly from said bearings to limit the axial movement of the latter.

ROY M. MAGNUSON